(12) United States Patent
Sui et al.

(10) Patent No.: US 11,265,726 B2
(45) Date of Patent: Mar. 1, 2022

(54) FLEXIBLE STANDALONE SPECTRUM FOR NB-IOT

(71) Applicant: Telefonaktiebolaget LM Ericsson (publ), Stockholm (SE)

(72) Inventors: Yutao Sui, Solna (SE); Dominique Everaere, Åkersberga (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 182 days.

(21) Appl. No.: 16/461,484

(22) PCT Filed: Nov. 17, 2017

(86) PCT No.: PCT/IB2017/057207
§ 371 (c)(1),
(2) Date: May 16, 2019

(87) PCT Pub. No.: WO2018/092079
PCT Pub. Date: May 24, 2018

(65) Prior Publication Data
US 2019/0349775 A1 Nov. 14, 2019

Related U.S. Application Data

(60) Provisional application No. 62/424,218, filed on Nov. 18, 2016.

(51) Int. Cl.
*H04W 16/14* (2009.01)
*H04W 72/04* (2009.01)
(Continued)

(52) U.S. Cl.
CPC ............ *H04W 16/14* (2013.01); *H04L 67/12* (2013.01); *H04W 4/70* (2018.02); *H04W 72/0453* (2013.01)

(58) Field of Classification Search
CPC ...... H04L 5/0007; H04L 67/12; H04W 16/14; H04W 4/70; H04W 72/0453
(Continued)

(56) References Cited

U.S. PATENT DOCUMENTS

2017/0332357 A1* 11/2017 Xu .................. H04W 72/10
2019/0045452 A1*  2/2019 Yang ............... H04W 52/26
2021/0289470 A1*  9/2021 Kumar ............. H04J 11/0073

OTHER PUBLICATIONS

Narrowband Internet of Things Whitepaper by J.Schlienz et al.—Aug. 8, 2016.
(Continued)

*Primary Examiner* — Gbemileke J Onamuti
(74) *Attorney, Agent, or Firm* — Sage Patent Group

(57) ABSTRACT

Embodiments described herein are directed to methods, apparatus and systems for virtualizing the standalone NB-IoT carrier to make it possible to place two standalone NB-IoT carriers side-by-side. The methods can include receiving a first anchor carrier in standalone spectrum shifted +/−2.5 kHz or +/−7.5 kHz from a 100 kHz raster grid. An indication can be received on the first anchor carrier that the first anchor carrier is operated as one of an inband carrier or a guardband carrier. A second carrier can be received in standalone spectrum, the second carrier separated from the first anchor carrier by less than 400 kHz.

26 Claims, 14 Drawing Sheets

(51) Int. Cl.
  *H04W 4/70* (2018.01)
  *H04L 29/08* (2006.01)
  *H04L 67/12* (2022.01)

(58) Field of Classification Search
  USPC .......................................................... 370/329
  See application file for complete search history.

(56) References Cited

OTHER PUBLICATIONS

3GPP TSG RAN WG1 Meeting #83; Anaheim, USA; Source: Huawei, HiSilicon; Title: Analysis of Channel Raster Impact on NB-IoT (R1-156924)—Nov. 15-22, 2015.
3GPP TSG RAN WG1 NB-IoT Ad-Hoc Meeting; Budapest, Hungary; Source: ZTE; Title: Summary of Channel Raster Email Discussion (R1-160052)—Jan. 18-20, 2016.
3GPP TSG RAN WG1 Meeting #84; St. Julian's, Malta; Source: Sony; Title: Consideration on NB-PBCH (R1-160668)—Feb. 15-19, 2016.
3GPP TSG RAN WG1 Meeting #84; St. Julian's, Malta; Source: Sony; Title: Considerations on Multi NB-IoT Carriers (R1-160671)—Feb. 15-19, 2016.
PCT International Search Report for International application No. PCT/IB2017/057207—dated Feb. 19, 2018.
PCT Written Opinion of the International Searching Authority for International application No. PCT/IB2017/057207—dated Feb. 19, 2 018.

\* cited by examiner

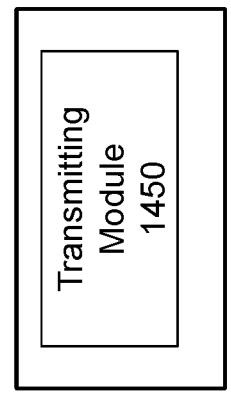
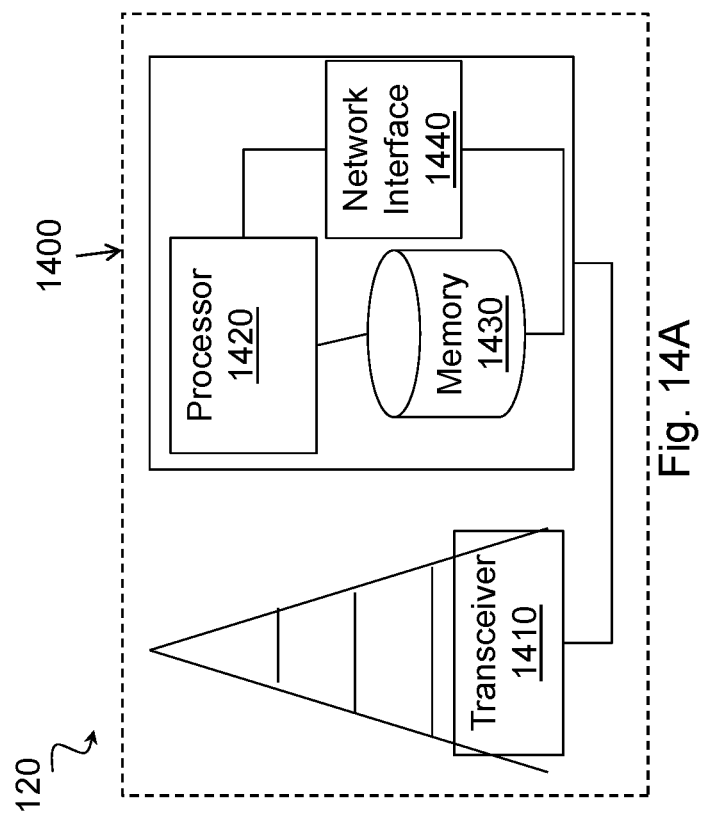

FLEXIBLE STANDALONE SPECTRUM FOR NB-IOT

CROSS-REFERENCE TO RELATED APPLICATIONS

This nonprovisional application is a U.S. National Stage Filing under 35 U.S.C. § 371 of international Patent Application Serial No. PCT/IB2017/057207 filed Nov. 17, 2017 and entitled "FLEXIBLE STANDALONE SPECTRUM FOR NB-IOT" which claims priority to U.S. Provisional Patent Application No. 61/424,218 filed Nov. 18, 2016 both of which are hereby incorporated by reference in their entirety.

FIELD

Embodiments of the invention relate to the field of wireless communication; and more specifically to flexible network deployment of standalone Narrowband Internet of Things (NB-IoT) systems.

INTRODUCTION

Cellular communication systems are currently being developed and improved for machine type communication (MTC), communication characterized by lower demands on data rates than for example mobile broadband, but with higher requirements on e.g. low-cost device design, better coverage, and ability to operate for years without charging or replacing the batteries. Currently, Third Generation Partnership Project (3GPP) standards include a feature called Narrowband Internet of Things (NB-IoT) for satisfying the requirements put forward by MTC type applications, while maintaining backward compatibility with the current long-term evolution (LTE) radio access technology. One 3GPP objective is to specify a radio access for cellular internet of things that addresses improved indoor coverage, support for massive number of low throughput devices, low delay sensitivity, ultra-low device cost, low device power consumption and (optimized) network architecture.

NB-IoT includes three different operation modes, i.e., stand-alone, guard-band, and in-band. In stand-alone mode, the NB-IoT system is operated in dedicated frequency bands. For in-band operation, the NB-IoT system can be placed inside the frequency bands used by the current LTE system, while in the guard-band mode, the NB-IoT system can be placed in the guard band used by the current LTE system. The NB-IoT can operate with a system bandwidth of 180 kHz. When multiple physical resource blocks (multi-PRBs) are configured, several 180 kHz PRBs can be used, e.g., for increasing the system capacity, inter-cell interference coordination, load balancing, etc.

The current multi-PRB (or multi-carrier) support of NB-IoT includes the following features:

Any combination, i.e., inband+inband, inband+guard-band, and guardband+guardband should be allowed for NB-IoT multi-carrier operation with the constraint that both guard-bands and the in-band are associated with the same LTE donor cell, i.e., the total span cannot exceed 110 PRBs from the same FFT;

No support of NB-IoT multi-carrier operation for stand-alone mode with either guard-band or in-band mode of operation;

Standalone+standalone should be allowed for NB-IoT multi-carrier operation with the constraint that the total frequency span cannot exceed 20 MHz and both NB-IoT carriers are synchronized, i.e., the time alignment error shall not exceed the minimum requirement for intra-band contiguous carrier aggregation in TS 36.104; and For a standalone multi carrier case with NB-IoT multi-carrier (multi-PRB) operation, it is not possible for it to work with other operation mode other than standalone mode.

The channel raster of the downlink of NB-IoT systems is on a frequency grid of 100 kHz. The NB-IoT devices try to find the NB-IoT carriers in a step size of 100 kHz. But for the in-band and guard-band operation due to the presence of the DC-carrier and the fact the center of the PRB is in between two sub-carriers, there is no PRB that falls directly on the cell search grid used in LTE in-band operation. The frequency offset to the 100 kHz grid is a minimum of ±2.5 kHz and ±7.5 kHz for even and odd number of PRBs in the LTE system bandwidth, respectively. An example is illustrated in FIG. 1.

FIG. 1 illustrates center frequency offset of LTE PRBs for even and odd system bandwidths. The ±2.5 kHz or ±7.5 kHz can be handled by the device during the cell search process and then be compensated. However, these offsets constrain the positions where NB-IoT carriers can be deployed for the in-band and guard-band operations. Therefore, for a NB-IoT downlink (DL) carrier that contains a synchronization signal and system information, it can only be put on a frequency that is near the 100 kHz grid point.

For guardband operation for an LTE system with 10 or 20 MHz system bandwidth, it is possible to find NB-IoT downlink carrier frequency that is 2.5 kHz off the 100 kHz frequency raster. For other LTE system bandwidths, the offset to the 100 kHz raster is 52.5 kHz. Therefore, to get within the same ±7.5 kHz to the 100 kHz grid, 3 guard subcarriers are needed. One guard carrier is 15 kHz width and placed in the same FFT grid at the legacy LTE system that gives orthogonality to the legacy LTE PRB. However, there are no other solutions to put the NB-IoT carriers on the exact 100 kHz raster grids on the LTE guard-band without losing orthogonality to the legacy LTE system.

In the Rel-13 NB-IoT, to adapt to certain use cases that require more capacity than usual, e.g., software or firmware upgrade, multi-carrier operations are. The NB-IoT listens to the system information on the anchor carrier, but when there is data, the communication can be moved to a secondary carrier. Several multi-PRB or multi-carrier configurations are shown in FIGS. 2-4.

FIG. 2 illustrates an example with the anchor PRB inband and the secondary PRB in-band. FIG. 3 illustrates an example with the anchor PRB inband and the secondary PRB in the guardband. FIG. 4 illustrates an example with the anchor PRB in the guardband and the secondary PRB in-band.

In Rel-14, the multi-carrier operation is extended. It includes paging on the downlink NB-IoT non-anchor carriers, and random access on the uplink NB-IoT non-anchor carriers.

In Rel-13 a UE in RRC_IDLE camps on the NB-IoT carrier on which the UE has received NB-PSS/SSS, NB-PBCH and SIB transmissions. A downlink anchor PRB or carrier herein is defined as where the NB-PSS/SSS, NB-PBCH and SIB transmissions take place. For initial access, the NB-IoT downlink/uplink frequency separation is configured by higher layers (SIBx) and is cell-specific. After the initial random access procedure success, there can also be a UE specific configuration for the NB-IoT downlink/uplink frequency separation. An uplink anchor PRB or carrier is defined as the uplink frequency that is signaled to the NB-IoT device via higher layer signaling. The uplink anchor PRB can be but not necessarily different from the PRB where the initial random access takes place.

There is no existing solution to facilitate standalone NB-IoT carrier working together with inband. Because of the 100 kHz raster requirement for the standalone operation, it is not possible to put anchor and non-anchor carriers side-by-side. The guard-band between two standalone NB-IoT carriers cannot be efficiently used.

The alternatives described above are not necessarily alternatives that have been previously conceived or pursued. Therefore, unless otherwise indicated herein, the alternatives described are not prior art and are not admitted to be prior art by inclusion in the Introduction.

SUMMARY

The presently disclosed embodiments are directed to solving one or more of the problems presented in the prior art, as well as providing additional features that will become readily apparent by reference to the following description when taken in conjunction with the accompanying drawing.

The embodiments described herein include ways to virtualize the standalone NB-IoT carrier to make it possible to place two standalone NB-IoT carriers side by side. Thus, according to one advantage, there is no guard-band required between two standalone NB-IoT carriers. One embodiment is directed to a method in a wireless device that includes receiving a first anchor carrier in standalone spectrum shifted +/−2.5 kHz or +/−7.5 kHz from a 100 kHz raster grid. An indication can be received on the first anchor carrier that the first anchor carrier is operated as one of an inband carrier or a guardband carrier. A second carrier can be received in standalone spectrum, the second carrier separated from the first anchor carrier by less than 400 kHz. Then, the wireless device can perform data communication with a network node, for example, utilizing the first and second carriers.

Another embodiment is directed to a method in a network node. The method can include transmitting a first anchor carrier in standalone spectrum shifted +/−2.5 kHz or +/−7.5 kHz from a 100 kHz raster grid, and transmitting an indication on the first anchor carrier that the anchor carrier is operated as one of an inband carrier or a guardband carrier. A second carrier is transmitted in standalone spectrum, the second carrier separated from the first anchor carrier by less than 400 kHz. The method further includes utilizing the first anchor carrier and the second carrier for data communication.

Of course, various hardware for performing the various method steps provided above are described herein, including processors and computer-readable media. Various methods and hardware for performing uplink methods are described herein as well. Finally, wireless communication systems comprising a plurality of NB-IoT nodes and wireless devices are provided to perform the method steps described herein.

A particular advantage of some embodiments is providing flexible ways for network operators who only have spectrum to deploy standalone NB-IoT system, and ensuring the extendibility of the NB-IoT system.

Other features and advantages will become obvious to one of ordinary skill in the art in light of the following detailed description and drawings.

BRIEF DESCRIPTION OF THE DRAWINGS

For a more complete understanding of the embodiments and their features and advantages, reference is now made to the following description, taken in conjunction with the accompanying drawings, in which:

FIG. 14A is a block diagram illustrating an example embodiment of a network node, according to an exemplary embodiment; and FIG. 14B is a block diagram illustrating example components of a network node, according to an exemplary embodiment.

DESCRIPTION OF EXEMPLARY EMBODIMENTS

Figure 1:
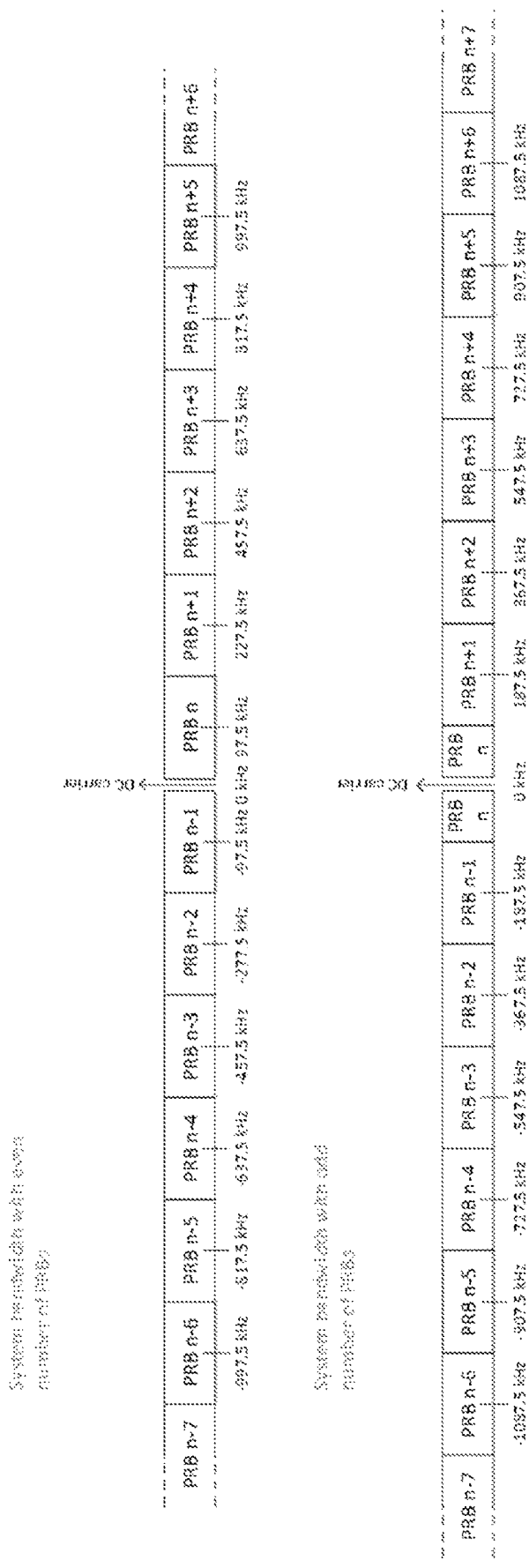
FIG. 1 illustrates center frequency offset of LTE PRBs for even and odd system bandwidths, according to an exemplary embodiment.
Figure 2:
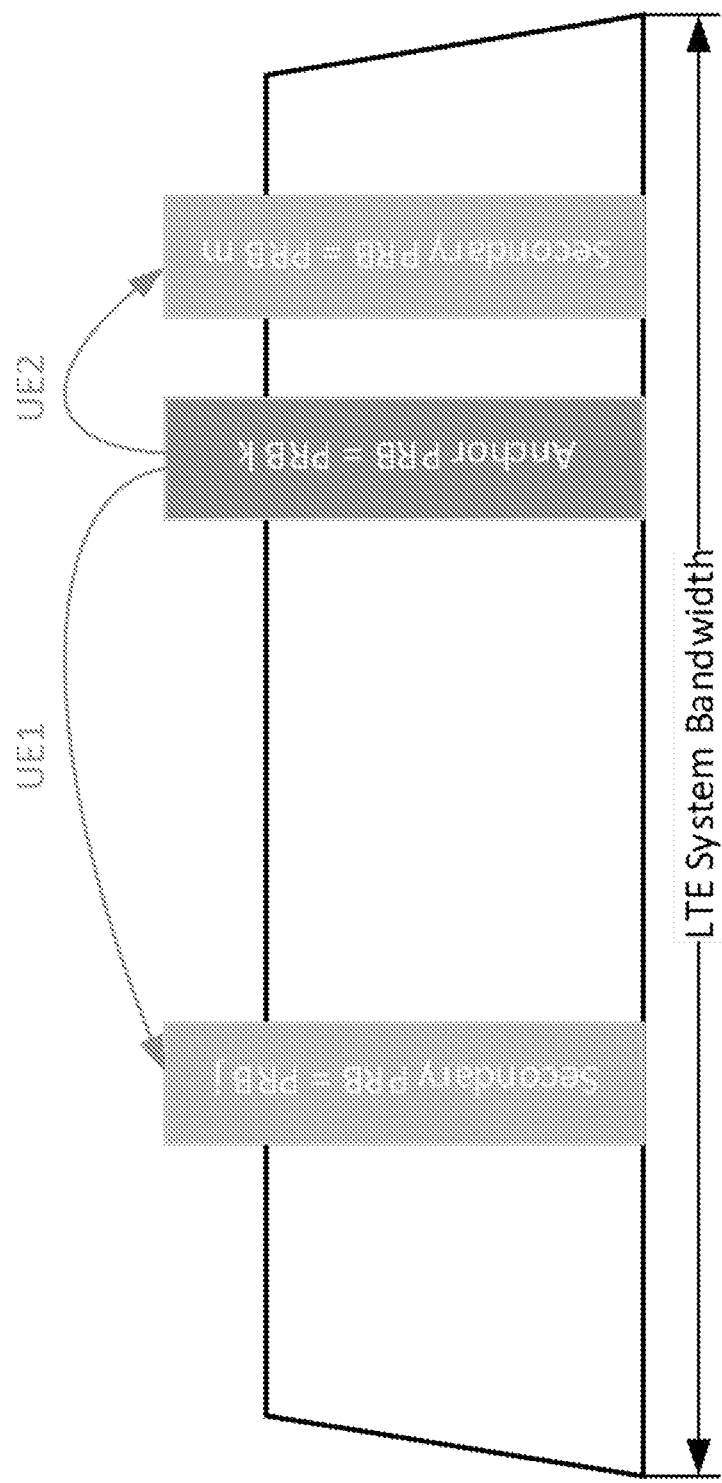
FIG. 2 illustrates an example with the anchor PRB inband and the secondary PRB inband, according to an exemplary embodiment.
Figure 3:
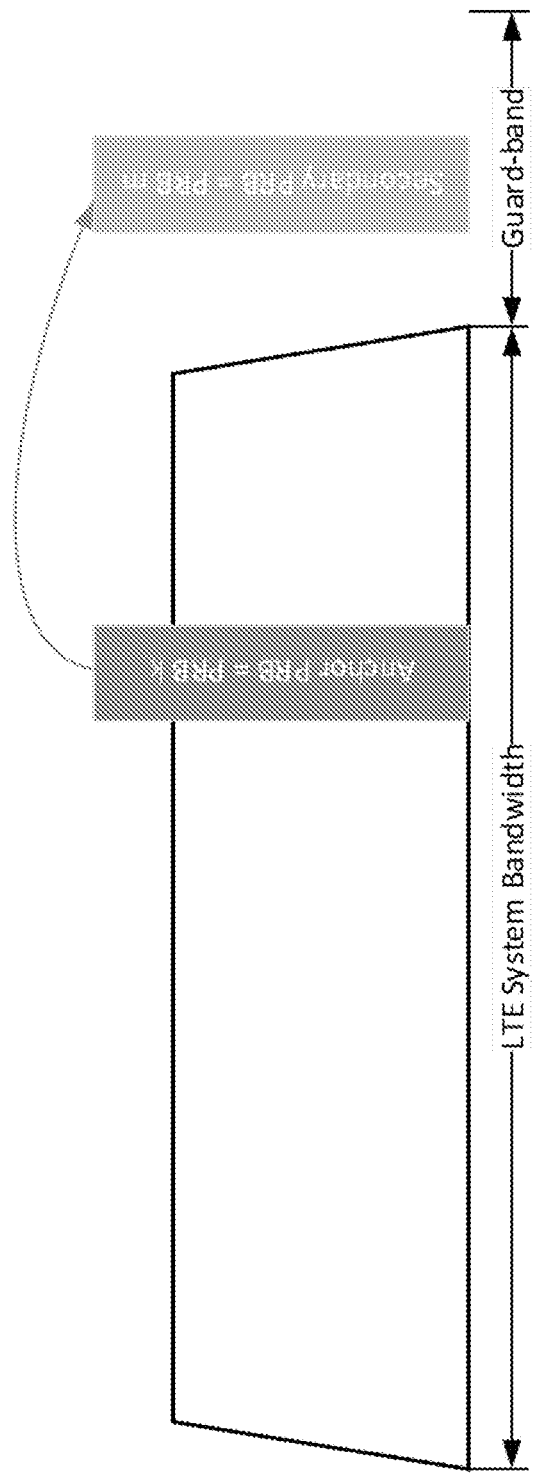
FIG. 3 illustrates an example with the anchor PRB inband and the secondary PRB in the guardband, according to an exemplary embodiment.
Figure 4:
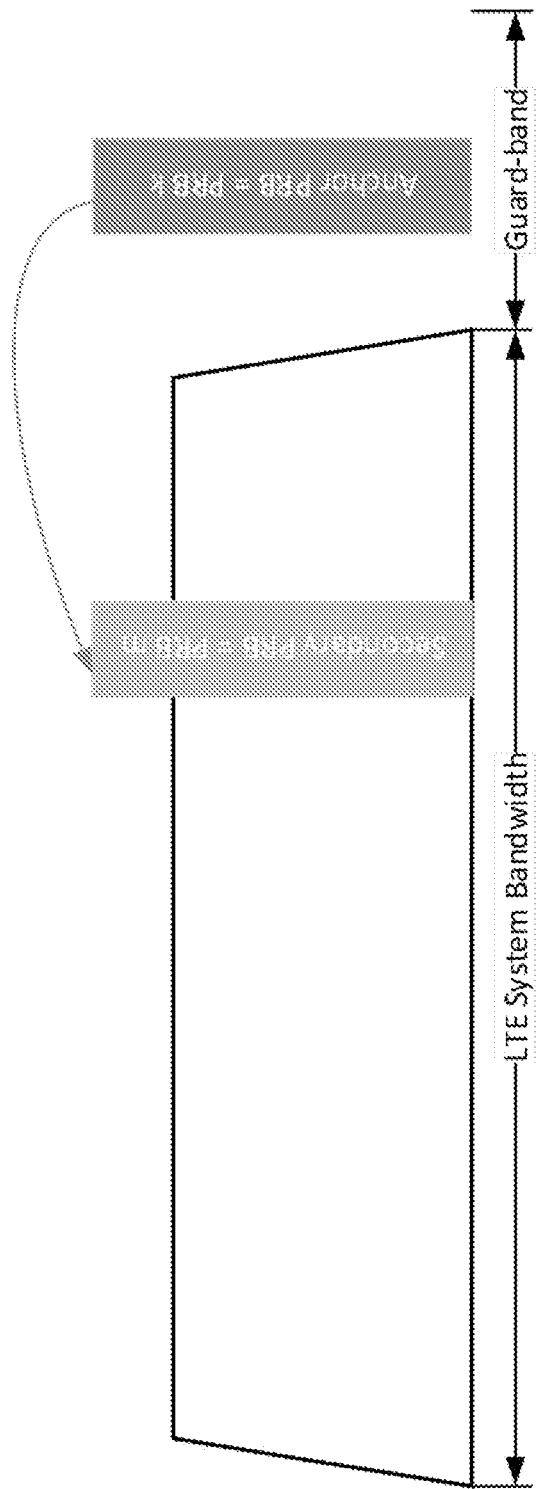
FIG. 4 illustrates an example with the anchor PRB in the guardband and the secondary PRB inband, according to an exemplary embodiment.
Figure 5:
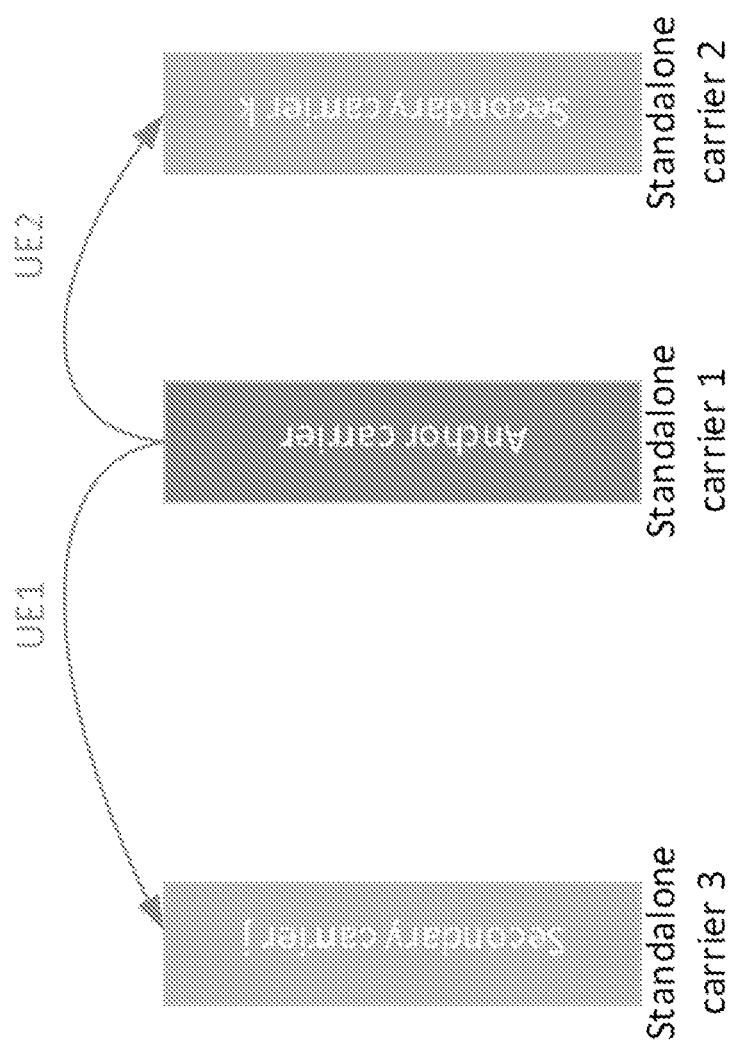
FIG. 5 illustrates an example with the anchor carrier in standalone and secondary carriers in other standalone carriers, according to an exemplary embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

Any two or more embodiments described in this document may be combined in any way with each other. The described embodiments are not limited to LTE, but can be adapted in other RATs, such as UTRA, LTE-Advanced, 5G, NX, NB-IoT, WiFi, BlueTooth, etc.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc. The UE may also be referred to as a wireless device.

In some embodiments, generic terminology "network node" is used. It can be any kind of network node which may comprise of a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., MME, SON node, a coordinating node, positioning node (e.g. SMLC, E-SMLC, etc.), MDT node, etc.), or even an external node (e.g., 3rd party node, a node external to the current network), etc.

The term "signaling" used herein may comprise any of: high-layer signaling (e.g., via RRC), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Particular embodiments are described with reference to FIGS. 1-14B of the drawings, like numerals being used for like and corresponding parts of the various drawings. LTE is used throughout this disclosure as an example cellular system, but the ideas presented herein may apply to other wireless communication systems as well.

Figure 6:
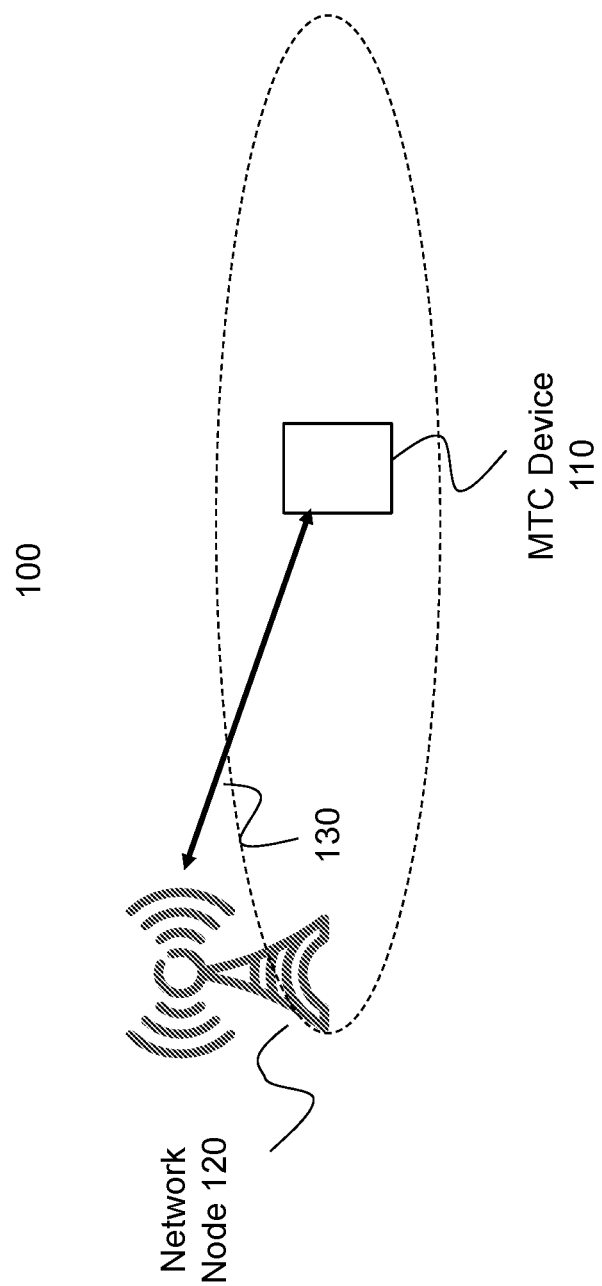
FIG. 6 illustrates an example wireless network, according to a particular embodiment.

FIG. 6 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic (e.g., broadcast video), and/or control signals. A network node 120 communicating voice traffic, data traffic, and/or control signals to wireless device 110 may be referred to as a serving network node 120 for the wireless device 110. Wireless signals 130 may include both downlink transmissions (from radio network node 120 to wireless devices 110) and uplink transmissions (from wireless devices 110 to radio network node 120).

In some embodiments, wireless device 110 may be referred to by the non-limiting term "UE." A UE may include any type of wireless device capable of communicating with a network node or another UE over radio signals. The UE may comprise radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

In some embodiments, network node 120 may include any type of network node such as a base station, radio base station, base transceiver station, base station controller, network controller, evolved Node B (eNB), Node B, multi-RAT base station, Multi-cell/multicast Coordination Entity (MCE), relay node, access point, radio access point, Remote Radio Unit (RRU) Remote Radio Head (RRH), a core network node (e.g., MME, SON node, a coordinating node, etc.), or even an external node (e.g., 3rd party node, a node external to the current network), etc.

In some embodiments, wireless device 110 comprises a NB-IoT device. Network 100 may include inband, guard-band, and standalone spectrum. Wireless device 110 is capable of multicarrier operation. Wireless device 110 may operate on one or more standalone NB-IoT carriers virtualized as either inband or guardband carriers. Network node 120 may transmit one or more standalone NB-IoT carriers virtualized as either inband or guardband carriers.

Each network node 120 may have a single transmitter or multiple transmitters for transmitting wireless signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120.

In wireless network 100, each radio network node 120 may use any suitable radio access technology, such as long-term evolution (LTE), LTE-Advanced, NR, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described below with respect to FIG. 13A. Similarly, a network node may include any suitable combination of hardware and/or software. For example, in particular embodiments, a network node, such as network node 120, may include the components described below with respect to FIG. 14A.

Network 100 may include system bandwidth as illustrated in FIG. 1. FIG. 1 illustrates the center frequency offsets of LTE PRBs from even and odd system bandwidths. The DC carrier is placed between two PRBs (even number of PRBs) or in the middle of the middle PRB (odd number cases). If a 100 kHz raster is used, not all PRBs can be used for NB-IoT in-band deployment. For the guard-band operation, though the granularity does not need to be 1 PRB, in order to maintain orthogonality to the legacy LTE system and limited the offset to ±2.5 kHz or ±7.5 kHz from 100 kHz raster grid, only several positions in the LTE guard-band can be used for the NB-IoT downlink anchor carriers. ±2.5 kHz and ±7.5 kHz offset from the 100 kHz grid can be accommodated by the cell search process.

To be more specific, for the guard-band operation for an LTE system with 10 or 20 MHz system bandwidth, it is possible to find NB-IoT downlink carrier frequency that is 2.5 kHz off the 100 kHz frequency raster. For other LTE system bandwidth, the offset to the 100 kHz raster is 52.5 kHz. Therefore, in order to get within the same ±7.5 kHz to the 100 kHz grid, 3 guard subcarriers are needed. One guard carrier is 15 kHz width and placed in the same FFT grid at the legacy LTE system that gives orthogonality to the legacy LTE PRB. However, there are no other solutions to put the NB-IoT downlink carriers on the exact 100 kHz raster grids on the LTE guard-band without losing orthogonality to the legacy LTE system. Therefore, for a NB-IoT downlink carrier that contains synchronization signal and system information, it can only be put on a frequency that is near the 100 kHz grid point.

To achieve coverage requirements of the NB-IoT systems, compared to the average LTE data channel transmit power, a 6 dB power boosting is preferred for the downlink of the in-band and guard-band deployment. The power boosting is with respect to the legacy data channel. But due to spectrum requirement, this 6 dB power boosting cannot be applied at arbitrary places in the guard band. To be more specific, the feasibility of boosting for transmission in the guard band depends on the system bandwidth, spacing between NB-IoT and LTE, and also the amount of boosting. When NB-IOT is not very close to the edge of the system bandwidth and with proper design of base station equipment, power boosting of up to 6 dB would be feasible.

By increasing the number of repetitions, NB-IoT devices without good coverage can still be reached when the transmit power is not high enough. But this is at an expense of the system capacity. This can be very problematic when the network traffic is heavier than usual, e.g., for the case of software and firmware update. Therefore, particular embodiments described herein include multi-PRB operations in NB-IoT to alleviate the problem.

When multi-PRB is configured, an NB-IoT listens to the anchor carrier for system information, but its data transmission can be moved to a secondary PRB. As the secondary PRB or carrier position(s) can be sent to the NB-IoT devices explicitly in Rel-13, e.g., by RRC configuration or via system information, the positions of the secondary PRB are not constrained to near the 100 kHz grid. In this way, NB-IoT devices in good coverage can be moved to secondary carriers with lower power, and NB-IoT devices in bad coverage can be served by carriers with higher power boosting. In Rel-14, the non-anchor carrier information is broadcast in SI. In some embodiments, UEs may move to another carrier via RRC.

For the uplink operation, the deployment is more flexible, as it is not necessary to put the uplink carrier in a position that is near the 100 kHz grid. The NB-IoT device can get the downlink and uplink carrier gap via system information (can be configured on an individual UE basis), if the default gap is not applied. Therefore, the placement of the uplink NB-IoT carrier has more flexibility. For the downlink operation, only 15 kHz subcarrier spacing is used for the NB-IoT system. But for the uplink, two different numerologies, i.e., 3.75 kHz and 15 kHz, of the uplink subcarrier spacing are defined in NB-IoT, for the single tone uplink transmission. For uplink with multi-tone transmission, only 15 kHz subcarrier spacing is used.

Particular embodiments prefer to deploy the uplink of the NB-IoT system on a 15 kHz FFT grid that is orthogonal to the legacy LTE system. This may ease the receiver design, since the guard-band signal can be received and processed together with the legacy LTE signal. However, as long as the interference between the NB-IoT system and the legacy LTE system is manageable, such a requirement can be relaxed, e.g., by using scheduling to lower the interference. Other methods are not precluded.

One common deployment situation is that an operator can re-farm its own frequency bands, e.g., change the frequency bands used for GSM/CDMA/WCDMA systems to LTE or NB-IoT standalone carriers. In such cases, some of the carriers of the systems will be shut down and used for new systems. To provide service to legacy users, some of the carriers of the legacy system will remain their services. An example is illustrated in FIG. 7.

Figure 7:
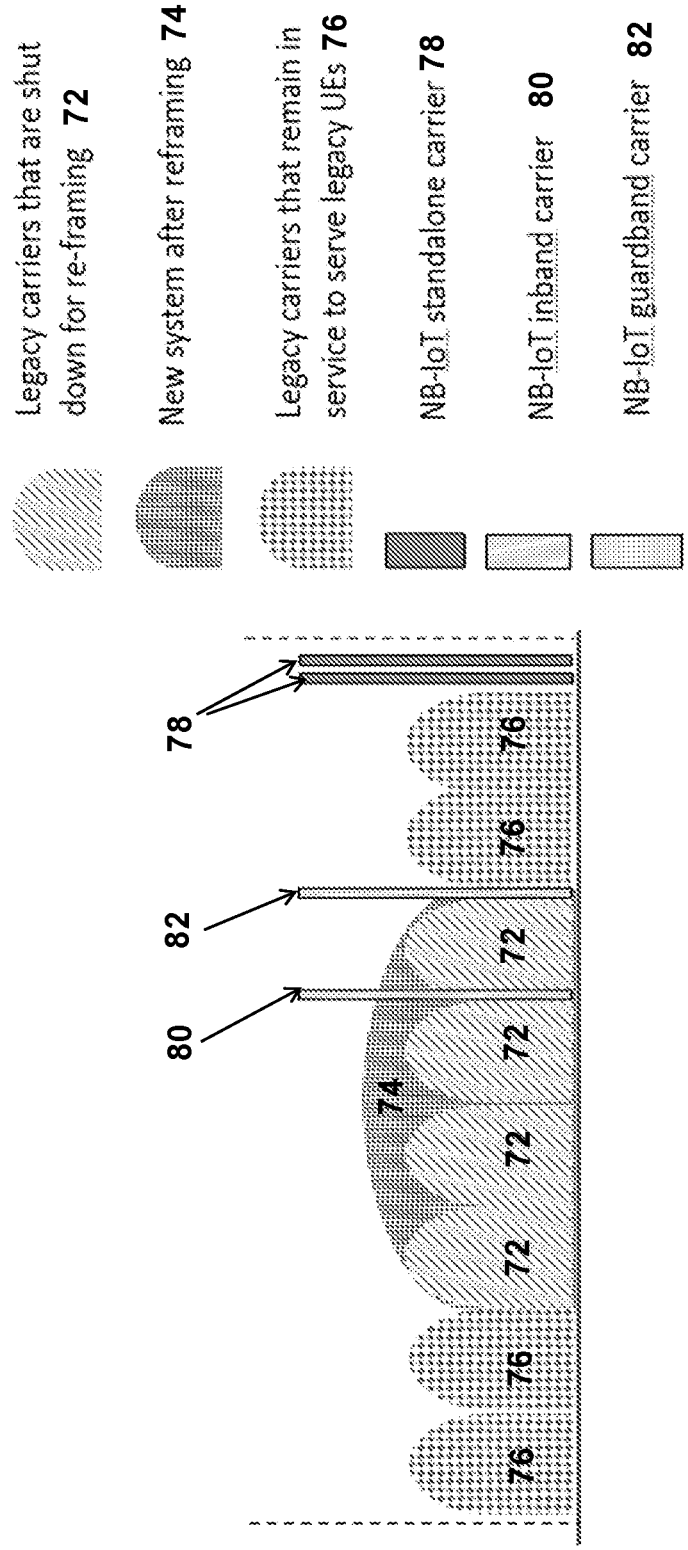
FIG. 7 illustrates an example re-farming scenario, according to an exemplary embodiment.

FIG. 7 illustrates an example re-farming scenario. In this example, several narrower carriers are shut down and the bandwidth is used for a wideband system. One problem after re-farm is that some small pieces of spectrum may be left unused, e.g., at the band edge(s). One way to use these small pieces of spectrum is to deploy NB-IoT system(s), which only require 200 kHz for standalone operation. This is an efficient way to use the fragmented spectrum. However, a particular limitation is that it is difficult to expand the NB-IoT system(s) in the future. As discussed above, since the multi-carrier operation of NB-IoT standalone carrier only works with another NB-IoT standalone carrier, it is not possible to further expend the NB-IoT standalone carriers to work with inband or guardband.

One possible solution to have flexible deployment of the NB-IoT system is that the standalone NB-IoT carrier can be virtualized to inband or guardband mode. The solution applies when NB-IoT standalone carrier(s) are deployed near an LTE system. In the embodiments described herein, the solution is expanded to virtualize the standalone NB-IoT carrier without necessarily involving the LTE carrier. An example is illustrated in FIG. 8.

Figure 8:
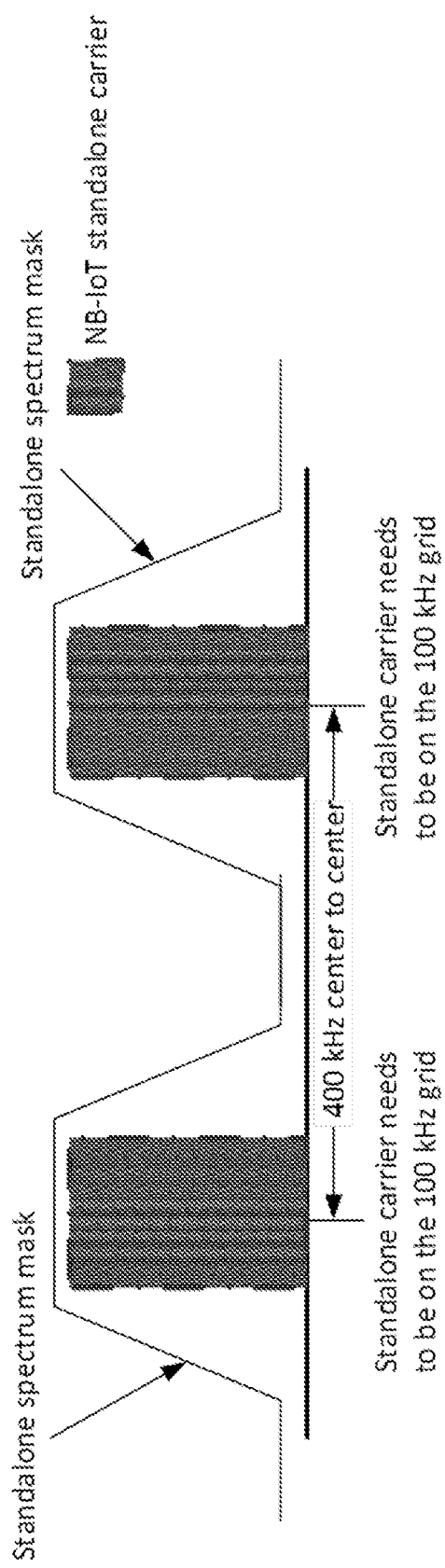
FIG. 8 is an example NB-IoT standalone deployment with two carriers, according to an exemplary embodiment.

FIG. 8 is an example NB-IoT standalone deployment with two carriers. Due to outband emission, the standalone spectrum mask needs to be fulfilled by each of the carriers, and a minimum 400 kHz center to center distance is required between two standalone NB-IoT carriers.

Figure 9:
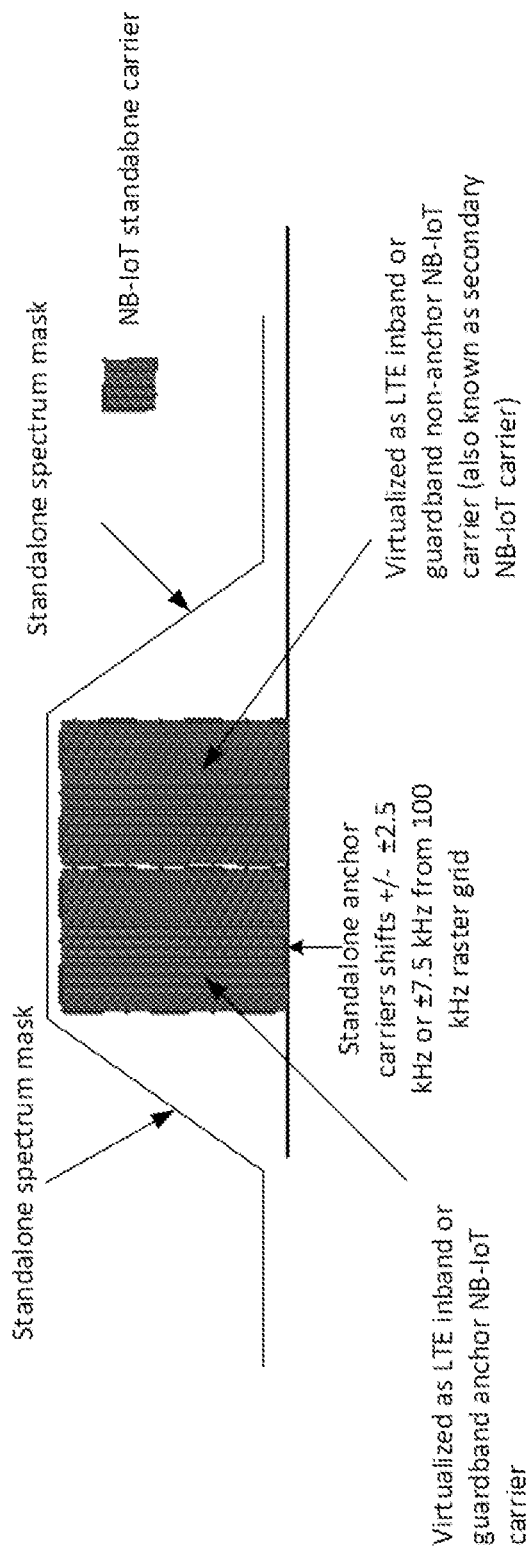
FIG. 9 is an example of virtualized standalone carriers as inband or guardband carriers, according to some embodiments.

FIG. 9 is an example of virtualized standalone carriers as inband or guardband carriers, according to some embodiments. Particular embodiments shift the downlink standalone anchor carrier, and make it +/−±2.5 kHz or ±7.5 kHz from 100 kHz raster grid. In this way, they can fulfill the inband or guardband channel raster requirement. Therefore, the NB-IoT UEs, such as wireless devices 110, will not have problem to sync to the anchor and acquire the operational mode information. The anchor carrier can then identify the NB-IoT system is operating either as inband or guardband mode. The non-anchor carriers can be placed next to the anchor carrier. For example, network node 120 may transmit the non-anchor carriers next to the anchor carrier. Since similar to the inband and guardband deployment, all the subcarriers fulfill the 15 kHz spacing and are orthogonal to each other, there is no need to place any guardband between the two carriers.

Regarding the out-band emission, it only requires the system fulfils the standalone spectrum mask at the outside of each carrier. If it is standalone only deployment, the requirement in 3GPP TS 36.104 apply. If NB-IoT standalone is deployed in a multi standard radio eNB with other system, e.g., GSM, WCDMA, and etc., the requirements in 3GPP TS 37.104 apply.

FIG. 9 is one example of one anchor carrier and one non-anchor carrier. Other embodiments may be expanded to the case with several non-anchor carriers. Another embodiment is illustrated in FIG. 10.

Figure 10:
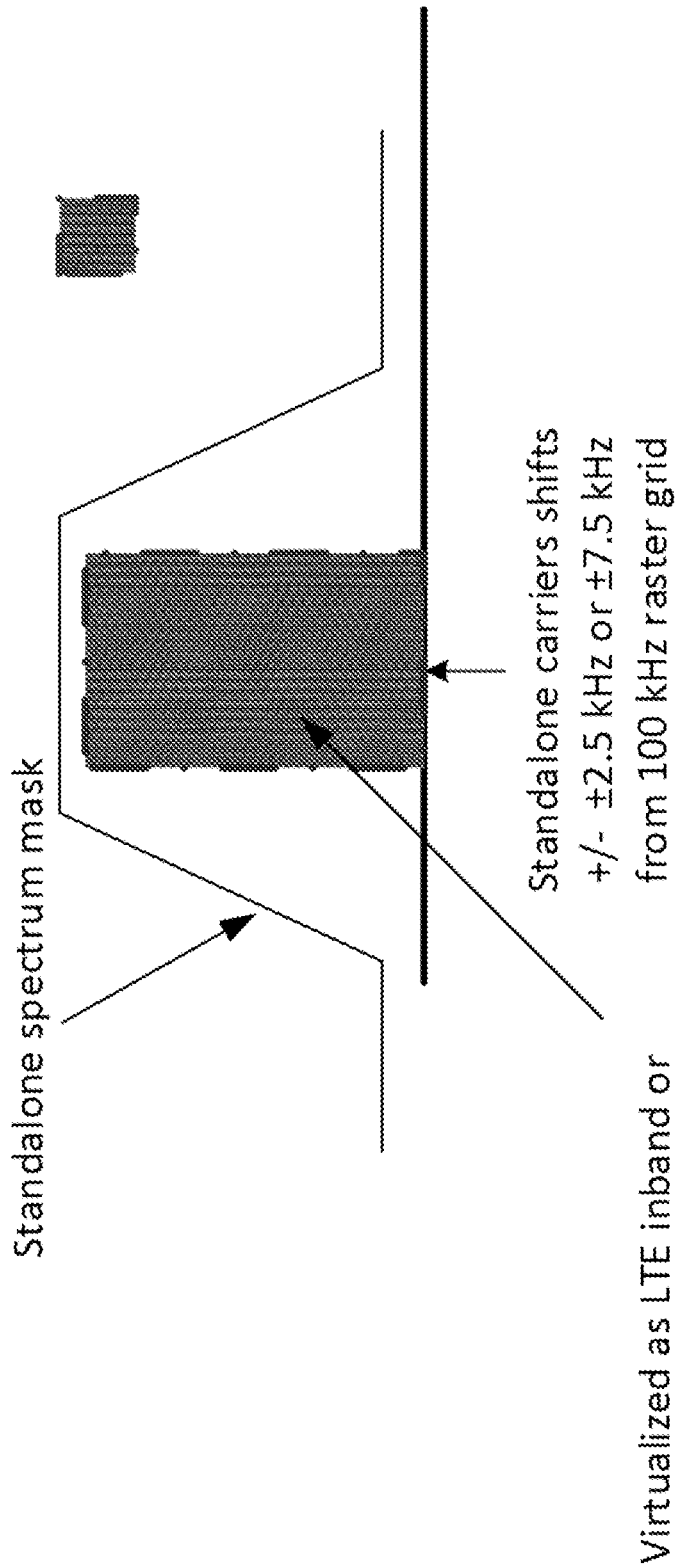
FIG. 10 illustrates an example virtualized single standalone carrier as inband or guardband carrier, according to some embodiments.

FIG. 10 illustrates an example virtualized single standalone carrier as inband or guardband carrier, according to some embodiments. In particular embodiments, the operator that does not have standalone spectrum, e.g., due to local regulations, can treat the NB-IoT system as guardband. This only requires shifting the carrier frequency +/−±2.5 kHz or ±7.5 kHz from 100 kHz raster grid, and the deployment mode indication in the MIB is set to guardband or inband even if there is no LTE system. For example, network node 120 may transmit a single standalone carrier as inband or guardband to wireless device 110.

Currently NB-IoT systems only operate in FDD, but the embodiments described herein also support TDD operation. Moreover, the embodiments described herein support both uplink and downlink as long as the radio requirement in 3GPP TS 36.104, TS 37.104 and TS 36.101 are fulfilled. However, since the uplink deployment has more flexibility as discussed in the Background section, whether to shift the uplink carrier depends on the deployment scenario.

Particular embodiments include methods in a wireless device and in a network node. Example methods are illustrated in FIGS. 11 and 12.

Figure 11:
FIG. 11 is a flow diagram of an example method in a wireless device, according to some embodiments.
Figure 12:
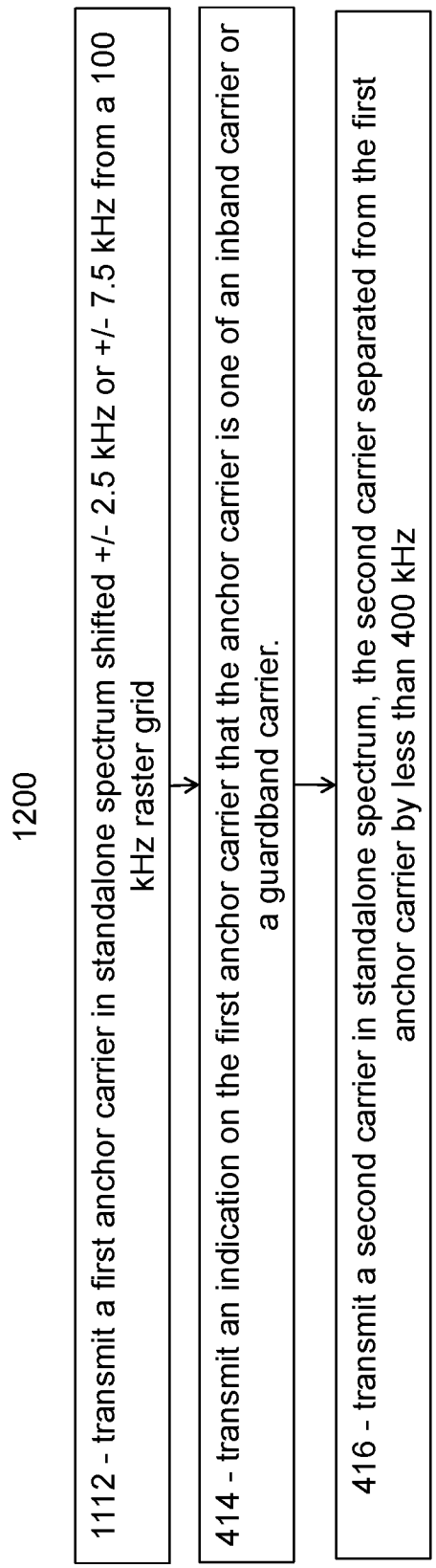
FIG. 12 is a flow diagram of an example method in a network node, according to some embodiments.

FIG. 11 is a flow diagram of an example method in a wireless device, according to some embodiments. In particular embodiments, one or more steps of method 1100 may be performed by components of wireless network 100 described with reference to FIG. 6.

Method 1100 begins at step 1112, where a wireless device receives a first anchor carrier in standalone spectrum shifted +/−2.5 kHz or +/−7.5 kHz from a 100 kHz raster grid. For example, wireless device 110 may receive, from network node 120, a first anchor carrier shifted +2.5 kHz from a 100 kHz raster grid.

At step 1114, the wireless device receives an indication on the first anchor carrier that the anchor carrier is one of an inband carrier or a guardband carrier. For example, wireless device 110 may receive a MIB or SIB on the first anchor carrier identifying the first anchor carrier as an inband carrier.

At step 1116, the wireless device receives a second carrier in standalone spectrum, the second carrier separated from the first anchor carrier by less than 400 kHz. For example, wireless device 110 may receive a second anchor carrier adjacent to the first anchor carrier (i.e., no guard band between the two carriers).

Modifications, additions, or omissions may be made to method 1100 illustrated in FIG. 11. Additionally, one or more steps in method 1100 may be performed in parallel or in any suitable order.

FIG. 12 is a flow diagram of an example method in a network node, according to some embodiments. In particular embodiments, one or more steps of method 1200 may be performed by components of wireless network 100 described with reference to FIG. 6.

Method 1200 begins at step 1212, where a network node transmits a first anchor carrier in standalone spectrum shifted +/−2.5 kHz or +/−7.5 kHz from a 100 kHz raster grid. For example, network node 120 may transmit, to wireless device 110, a first anchor carrier shifted +2.5 kHz from a 100 kHz raster grid.

At step 1214, the network node transmits an indication on the first anchor carrier that the anchor carrier is one of an inband carrier or a guardband carrier. For example, network node 120 may transmit a MIB or SIB on the first anchor carrier identifying the first anchor carrier as an inband carrier.

At step 1216, the network node transmits a second carrier in standalone spectrum, the second carrier separated from the first anchor carrier by less than 400 kHz. For example, network node 120 may transmit a second anchor carrier adjacent to the first anchor carrier (i.e., no guard band between the two carriers).

Modifications, additions, or omissions may be made to method 1200 illustrated in FIG. 12. Additionally, one or more steps in method 1200 may be performed in parallel or in any suitable order.

Figure 13B:
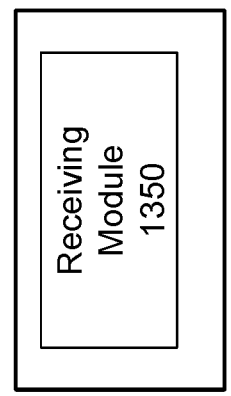
FIG. 13B is a block diagram illustrating example components of a wireless device, according to an exemplary embodiment.
Figure 13A:
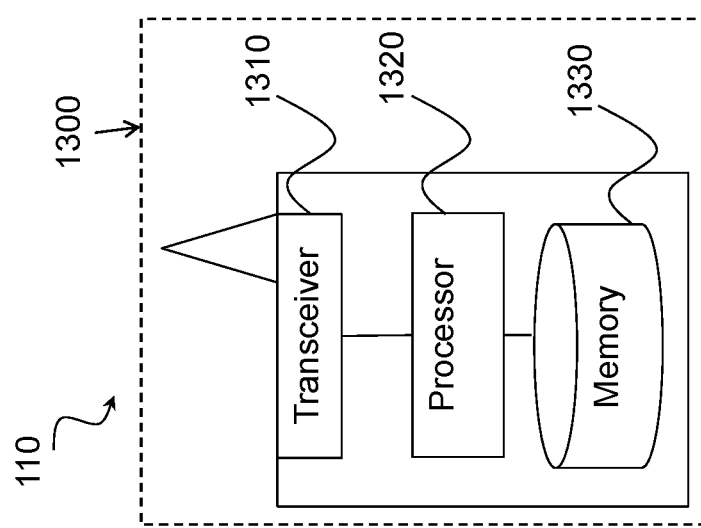
FIG. 13A is a block diagram illustrating an example embodiment of a wireless device, according to an exemplary embodiment.

FIG. 13A is a block diagram illustrating an example embodiment of a wireless device. The wireless device is an example of the wireless devices 110 illustrated in FIG. 6. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a NB-IoT device, or any other device that can provide wireless communication. The wireless device includes processing circuitry 1300. Processing circuitry 1300 includes transceiver 1310, processor 1320, and memory 1330. In some embodiments, transceiver 1310 facilitates transmitting wireless signals to and receiving wireless signals from wireless network node 120 (e.g., via an antenna), processor 1320 executes instructions to provide some or all of the functionality described herein as provided by the wireless device, and memory 1330 stores the instructions executed by processor 1320.

Processor 1320 includes any suitable combination of hardware and software implemented in one or more integrated circuits or modules to execute instructions and manipulate data to perform some or all of the described functions of the wireless device. In some embodiments, processor 1320 may include, for example, one or more computers, one more programmable logic devices, one or more central processing units (CPUs), one or more microprocessors, one or more applications, and/or other logic, and/or any suitable combination of the preceding. Processor 1320 may include analog and/or digital circuitry configured to perform some or all of the described functions of wireless device 110. For example, processor 1320 may include resistors, capacitors, inductors, transistors, diodes, and/or any other suitable circuit components.

Memory 1330 is generally operable to store computer executable code and data. Examples of memory 530 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 1320 in communication with transceiver 1310 communicates virtualized NB-IoT carriers with network node 120. Other embodiments of the wireless device may include additional components (beyond those shown in FIG. 13A) responsible for providing certain aspects of the wireless device's functionality, including any of the functionality described above and/or any additional functionality (including any functionality necessary to support the solution described above).

FIG. 14B is a block diagram illustrating example components of a wireless device 110. The components may include receiving module 1350.

Receiving module 1350 may perform the receiving functions of wireless device 110. For example, receiving module 1350 may perform the receiving functions of steps 1112-16 in FIG. 11. In certain embodiments, receiving module 650 may include or be included in processor 1320.

FIG. 14A is a block diagram illustrating an example embodiment of a network node. Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes processing circuitry 1400. Processing circuitry 1400 includes at least one transceiver 1410, at least one processor 1420, at least one memory 1430, and at least one network interface 1440. Transceiver 1410 facilitates transmitting wireless signals to and receiving wireless signals from a wireless device, such as wireless devices 110 (e.g., via an antenna); processor 1420 executes instructions to provide some or all of the functionality described above as being provided by a network node 120; memory 1430 stores the instructions executed by processor 1420; and network interface 1440 communicates signals to backend network components, such as a gateway, switch, router, Internet, Public Switched Telephone Network (PSTN), controller, and/or other network nodes 120. Processor 1420 and memory 1430 can be of the same types as described with respect to processor 1320 and memory 1330 of FIG. 13A above.

In some embodiments, network interface 1440 is communicatively coupled to processor 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network. In particular embodiments, processor 1420 in communication with transceiver 1410 communicates virtualized NB-IoT carriers with wireless device 110.

Other embodiments of network node 120 include additional components (beyond those shown in FIG. 14A) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

FIG. 14B is a block diagram illustrating example components of a network node 120. The components may include transmitting module 1450.

Transmitting module 1450 may perform the transmitting functions of network node 120. For example, transmitting module 1450 may perform the transmitting functions of steps 1212-16 in FIG. 12. In certain embodiments, transmitting module 1450 may include or be included in processor 1420.

Some embodiments of the disclosure may provide one or more technical advantages. Some embodiments may benefit from some, none, or all of these advantages. Other technical advantages may be readily ascertained by one of ordinary skill in the art.

Although this disclosure has been described in terms of certain embodiments, alterations and permutations of the embodiments will be apparent to those skilled in the art. Although some embodiments have been described with reference to certain radio access technologies, any suitable radio access technology (RAT) or combination of radio access technologies may be used, such as long term evolution (LTE), LTE-Advanced, NR, UMTS, HSPA, GSM, cdma2000, WiMax, WiFi, etc. Accordingly, the above description of the embodiments does not constrain this disclosure. Other changes, substitutions, and alterations are possible without departing from the spirit and scope of this disclosure.

ABBREVIATIONS

3GPP 3rd Generation Partnership Project
CA Carrier Aggregation
CC Carrier Component
CRS Common Reference Signal
eNB Evolved Node B
eNodeB Evolved Node B
E-UTRA Enhanced UTRA
FDD Frequency Division Duplex
LTE Long-Term Evolution MIB Master Information Block
MTC Machine Type Communication
NB Narrowband
NB-IoT Narrowband Internet of Things
NB-PBCH Narrowband Physical Broadcast Channel
NB-PSS Narrowband Primary Synchronization Sequence
NB-SSS Narrowband Secondary Synchronization Sequence
OFDM Orthogonal Frequency
PDCCH Physical Downlink Control Channel
PSS Primary Synchronization Source
RAT Radio Access Technology
RF Radio Frequency
RRC Radio Resource Control
SIB System Information Block
SSS Secondary Synchronization Source
TDD Time Division Duplex
UE User Equipment
UMTS Universal Mobile Telecommunications System
UTRA UMTS Terrestrial Radio Access

What is claimed is:

1. A method in a wireless device comprising:
receiving a first anchor carrier in standalone spectrum shifted +/−2.5 kHz or +/−7.5 kHz from a 100 kHz raster grid;
receiving an indication on the first anchor carrier that the first anchor carrier is operated as one of an inband carrier or a guardband carrier;
receiving a second carrier in standalone spectrum, the second carrier separated from the first anchor carrier by less than 400 kHz; and
utilizing the first anchor carrier and the at least one second carrier for data communication.

2. A wireless device comprising processing circuitry, the processing circuitry operable to perform the steps of claim 1.

3. A method in a network node, comprising:
transmitting a first anchor carrier in standalone spectrum shifted +/−2.5 kHz or +/−7.5 kHz from a 100 kHz raster grid;
transmitting an indication on the first anchor carrier that the anchor carrier is operated as one of an inband carrier or a guardband carrier;
transmitting a second carrier in standalone spectrum, the second carrier separated from the first anchor carrier by less than 400 kHz; and
utilizing the first anchor carrier and the second carrier for data communication.

4. A network node comprising a processing circuitry, the processing circuitry operable to perform the steps of claim 3.

5. A non-transitory computer-readable medium storing instructions thereon for, when executed by a processor, performing a method in a wireless device, comprising:
receiving a first anchor carrier in standalone spectrum shifted +/−2.5 kHz or +/−7.5 kHz from a 100 kHz raster grid;
receiving an indication on the first anchor carrier that the first anchor carrier is operated as one of an inband carrier or a guardband carrier;
receiving a second carrier in standalone spectrum, the second carrier separated from the first anchor carrier by less than 400 kHz; and
utilizing the first anchor carrier and the second carrier for data communication.

6. The computer-readable medium of claim 5, wherein the first anchor carrier and the second carrier are not separated by a guardband.

7. The computer-readable medium of claim 5, wherein the first anchor carrier and the second carrier comprise NB-IoT carriers.

8. The computer-readable medium of claim 5, wherein the second carrier is associated with the first anchor carrier.

9. The computer-readable medium of claim 5, wherein a plurality of second carriers are received, each of which is separated from a neighboring carrier by less than 400 kHz.

10. A non-transitory computer-readable medium storing instructions thereon for, when executed by a processor, performing a method in a network node, comprising:
transmitting a first anchor carrier in standalone spectrum shifted +/−2.5 kHz or +/−7.5 kHz from a 100 kHz raster grid;
transmitting an indication on the first anchor carrier that the anchor carrier is operated as one of an inband carrier or a guardband carrier;
transmitting a second carrier in standalone spectrum, the second carrier separated from the first anchor carrier by less than 400 kHz; and
utilizing the first anchor carrier and the second carrier for data communication.

11. The computer-readable medium of claim 10, wherein the first anchor carrier and the second carrier are not separated by a guardband.

12. The computer-readable medium of claim 10, wherein the first anchor carrier and the second carrier comprise NB-IoT carriers.

13. The computer-readable medium of claim 10, wherein the second carrier is associated with the first anchor carrier.

14. The computer-readable medium of claim 10, wherein a plurality of second carriers are transmitted, each of which is separated from a neighboring carrier by less than 400 kHz.

15. A method in a user equipment (UE), comprising:
transmitting a first anchor carrier in standalone spectrum shifted by a carrier gap stored in a receiving node;
transmitting an indication on the first anchor carrier that the anchor carrier is operated as one of an inband carrier or a guardband carrier;
transmitting a second carrier in standalone spectrum, the second carrier separated from the first anchor carrier by less than 400 kHz; and
utilizing the first anchor carrier and the second carrier for data communication.

16. The method of claim 15, wherein the first anchor carrier is shifted by a default carrier gap.

17. The method of claim 15, wherein the first anchor carrier is shifted by a carrier gap specific to the UE.

18. The method of claim 15, wherein the first anchor carrier and the second carrier are not separated by a guardband.

19. The method of claim 15, wherein the first anchor carrier and the second carrier comprise NB-IoT carriers.

20. The method of claim 15, wherein the second carrier is associated with the first anchor carrier.

21. The method of claim 15, wherein a plurality of second carriers are transmitted, each of which is separated from a neighboring carrier by less than 400 kHz.

22. The method of claim 15, wherein the receiving node is a narrowband-IoT node.

23. A user equipment (UE) comprising processing circuitry, the processing circuitry operable to perform the steps of claim 15.

24. A method in a narrowband (NB)-IoT node, comprising:

receiving, from a user equipment, a first anchor carrier in standalone spectrum shifted by a carrier gap stored in the NB-IoT node;

receiving an indication on the first anchor carrier that the anchor carrier is operated as one of an inband carrier or a guardband carrier;

receiving a second carrier in standalone spectrum, the second carrier separated from the first anchor carrier by less than 400 kHz; and utilizing the first anchor carrier and the second carrier for data communication.

25. The method of claim 24, wherein the first anchor carrier is shifted by a default carrier gap.

26. A narrowband (NB)-IoT comprising processing circuitry, the processing circuitry operable to perform the steps of claim 24.

* * * * *